United States Patent Office 2,909,525
Patented Oct. 20, 1959

2,909,525
ANTI-FUNGAL COMPOUNDS
Theodore I. Fand, White Plains, N.Y., assignor to Warner-Lambert Pharmaceutical Company
No Drawing. Application August 8, 1957
Serial No. 676,938
2 Claims. (Cl. 260—290)

This invention relates to certain fungicidal compounds and relates more particularly to certain novel quaternary ammonium compounds of 2-methyl-5-ethyl-pyridine (aldehyde collidine) which are useful as topically active fungicides.

An object of this invention is the provision of a fungicidal agent useful in the formulation of fungicidal compositions which have a broad fungicidal spectrum.

Another object of this invention is the provision of a fungicidal agent active in relatively low concentrations against organisms which are ordinarily difficult to control.

Other objects of this invention will appear from the following detailed description.

I have now found that quaternary ammonium compounds of 2-methyl-5-ethyl-pyridine, also called aldehyde collidine, are highly active fungicidal agents and, more particularly, those quaternary compounds having the following formula:

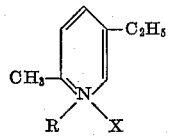

wherein R is an alkyl group of up to about 20 carbon atoms, but preferably containing from about 10 to 20 carbon atoms, and X is the anion of an inorganic or an organic acid. For example, when X is the anion of an inorganic acid it may be a chloride, bromide, iodide, phosphate or sulfate group, and when X is the anion of an organic acid it may be the anion of a monobasic or dibasic acid such as acetic, propionic, tartaric, succinic, citric, malic, maleic or benzoic acid.

To form the novel quaternary ammonium compounds of my invention, the desired alkyl halide is added to aldehyde collidine, preferably in stoichiometric ratio, and the mixture then allowed to react at 25° to 160° C. for from 3 to 24 hours. On cooling, the quaternary ammonium compound formed precipitates, and may be separated from any unreacted material by washing with ether.

To obtain those novel quaternary ammonium compounds of aldehyde collidine in which the anion is organic, a quaternary derivative in which the anion X is a chloride, bromide or iodide group, for example, is dissolved in water and stirred with a stoichiometric amount of the silver salt of the organic acid for 24 to 96 hours at 25° to 100° C. The silver halide precipitate is removed by filtration and the quaternary derivative in which X is an organic anion is recovered from the filtrate by conventional methods.

In order further to illustrate my invention but without being limited thereto, the following examples are given:

Example I 12.1 parts by weight of aldehyde collidine and 30.5 parts by weight of cetyl bromide are heated at 150–160° C. for six hours while passing a stream of nitrogen through the mixture to provide constant agitation. The mixture is cooled and solidifies to a white mass. The latter is stirred with anhydrous ether and the undissolved white crystalline material filtered off. 34 parts by weight of 1-cetyl-5-ethyl-2-methyl-pyridinium bromide are obtained melting at about 80° C. This novel compound is fungicidal against E. floccosum in concentrations as low as 4.7 mg./liter, against T. rubrum in a concentration of 2.3 mg./liter and against T. mentagrophytes in a concentration of 4.7 mg./liter.

Example II 36.3 parts by weight of aldehyde collidine and 55.6 parts by weight of "Lorol" chloride (a mixture of straight chain alkyl chlorides, predominantly $C_{12}H_{25}Cl$ and containing about 20% of $C_{14}H_{29}Cl$) are mixed and heated at 160° C. for 24 hours while passing nitrogen gas through the mixture. The mixture is dissolved in water and extracted three times with ether to remove unreacted starting materials. The aqueous layer is treated with charcoal, filtered and evaporated on a steam bath to remove the water. Upon cooling a viscous water-soluble residue comprising the desired quaternary is obtained giving a positive test for the chloride ion.

The fungistatic activity of the compound to be tested is determined by a procedure which involves carrying out two-fold serial dilutions using 1 cc. volumes, the dilutions being made through nineteen tubes and starting with a concentration in the first tube of 5000 mg./liter. Suitable 25 day malt broth cultures of the organism against which the fungistatic activity is to be determined are used to inoculate each tube and the tubes are read at 72 hours. The compounds of this invention have been found to have from two to four times the fungistatic activity of closely related known homologs such as pyridinium cetyl bromide and 1-acetyl-2-ethyl pyridinium bromide, for example.

The novel compounds of my invention are also useful as mildew inhibitors for cellulosic materials. They afford appreciable protection for cotton when applied thereto from a suitable solvent, such as alcohol, in amount of from 6 to 65 milligrams per gram of cotton material.

This application is a continuation-in-part of application S. No. 537,872, filed September 29, 1955, now abandoned.

It is understood that the foregoing detailed description is given merely by way of illustration and that many variations may be made therein without departing from the spirit of my invention.

Having described my invention, what I desire to secure by Letters Patent is:

1. Quaternary ammonium compounds of the formula:

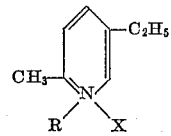

wherein R is an alkyl group containing 16 carbon atoms and X is an acid anion.

2. The quaternary ammonium compound 1-cetyl-5-ethyl-2-methyl-pyridinium bromide.

References Cited in the file of this patent
UNITED STATES PATENTS 2,734,815    Mowry et al. _____ Feb. 14, 1956
2,776,291    Russo _____ Jan. 1, 1957

OTHER REFERENCES

Cicero et al.: Chem. Abstracts, vol. 42, col. 3891 (1948).
Harris et al.: Chem. Abstracts, vol. 46, col. 3537 (1952).
Ito: Chem. Abstracts, vol. 48, col. 13796 (1954).